US012661943B1

(12) United States Patent
Tavakolikhaledi et al.

(10) Patent No.: US 12,661,943 B1
(45) Date of Patent: Jun. 23, 2026

(54) REMOTELY CONTROLLED OR AUTONOMOUS MARSUPIAL SYSTEM AND METHODS FOR REMOTELY OR AUTONOMOUSLY PERFORMING OPERATIONS WITH SAME

(71) Applicant: Avestec Technolgies Inc., Burnaby (CA)

(72) Inventors: Mohammadreza Tavakolikhaledi, Vancouver (CA); Pouya Kamalinejad, Vancouver (CA)

( * ) Notice: Subject to any disclaimer, the term of this patent is extended or adjusted under 35 U.S.C. 154(b) by 0 days.

(21) Appl. No.: 19/184,389

(22) Filed: Apr. 21, 2025

(51) Int. Cl.
*B60F 3/00* (2006.01)
*B62D 57/02* (2006.01)
*B64U 60/00* (2023.01)

(52) U.S. Cl.
CPC ............ *B60F 3/0061* (2013.01); *B62D 57/02* (2013.01); *B64U 60/00* (2023.01); *B64U 2201/10* (2023.01); *B64U 2201/20* (2023.01)

(58) Field of Classification Search
CPC .............. B60F 3/0061; B64U 2201/10; B64U 2201/20; B64U 20/00; B64U 20/40; B64U 10/60
See application file for complete search history.

(56) References Cited

U.S. PATENT DOCUMENTS

| | | | | |
|---|---|---|---|---|
| 11,472,498 B2 * | 10/2022 | Abdellatif | .............. | B62D 61/12 |
| 11,548,634 B2 | 1/2023 | Tavakolikhakaledi et al. | | |

| | | | | |
|---|---|---|---|---|
| 11,679,875 B2 * | 6/2023 | Abdellatif | ............... | B64C 25/32 |
| | | | | 244/17.11 |
| 11,745,872 B2 * | 9/2023 | Troy | ......................... | B64F 5/40 |
| | | | | 244/1 R |
| 11,807,407 B2 * | 11/2023 | Asfoor | .................... | B64U 60/20 |
| 2016/0068261 A1 * | 3/2016 | Niederberger | ......... | B64U 10/14 |
| | | | | 244/2 |
| 2017/0267345 A1 * | 9/2017 | Marom | .................... | B64D 1/12 |
| 2019/0055018 A1 * | 2/2019 | Bei | ......................... | B64U 70/92 |
| 2020/0140081 A1 * | 5/2020 | Levy | ....................... | B64C 13/16 |
| 2020/0172231 A1 * | 6/2020 | Abdellatif | ............... | B60G 3/01 |
| 2020/0174478 A1 * | 6/2020 | Abdellatif | ............... | G01S 17/86 |
| 2020/0307786 A1 * | 10/2020 | Tavakolikhakaledi | ...................... | |
| | | | | B64U 50/30 |
| 2021/0070438 A1 * | 3/2021 | Hoshide | ................. | B25J 9/1679 |

(Continued)

FOREIGN PATENT DOCUMENTS

| | | | | | |
|---|---|---|---|---|---|
| CN | 111650964 A | * | 9/2020 | ............... | H02J 7/35 |
| CN | 116348379 A | * | 6/2023 | ............. | B64U 80/25 |

(Continued)

*Primary Examiner* — Benjamin P Lee
(74) *Attorney, Agent, or Firm* — Own Innovation Inc.; James W. Hinton; Daniel B. Biggs

(57) ABSTRACT

A marsupial robotics system for performing an operation, such as inspection, on various surfaces is presented herein. The marsupial robotics system can be employed for performing the operation on various environments and surfaces in remotely controlled and autonomous fashions. The marsupial robotics system includes an aerial vehicle and a crawler detachably carried by the aerial vehicle and configured to perform the operation on a target surface. The aerial vehicle includes a landing structure from which the aerial vehicle is configured to attach to a deployment site. At the deployment site, the crawler is configured to detach from the aerial vehicle and move to the target surface to perform the operation on the target surface.

21 Claims, 6 Drawing Sheets

(56)                    References Cited

U.S. PATENT DOCUMENTS

2022/0041281 A1*   2/2022   Amsili ................. G05D 1/0094
2022/0169381 A1*   6/2022   Alrasheed ............ G05D 1/0094
2022/0177125 A1*   6/2022   Abdellatif ............. B64U 10/13
2023/0034243 A1*   2/2023   Ceborahs .............. B60B 19/006
2023/0390939 A1*   12/2023   Hashimoto ............. B64D 1/02

FOREIGN PATENT DOCUMENTS

NL            2012975 B1 *   6/2016   ............ B64C 27/04
WO   WO-2019109164 A1 *   6/2019   ............ B64U 70/30

* cited by examiner

600

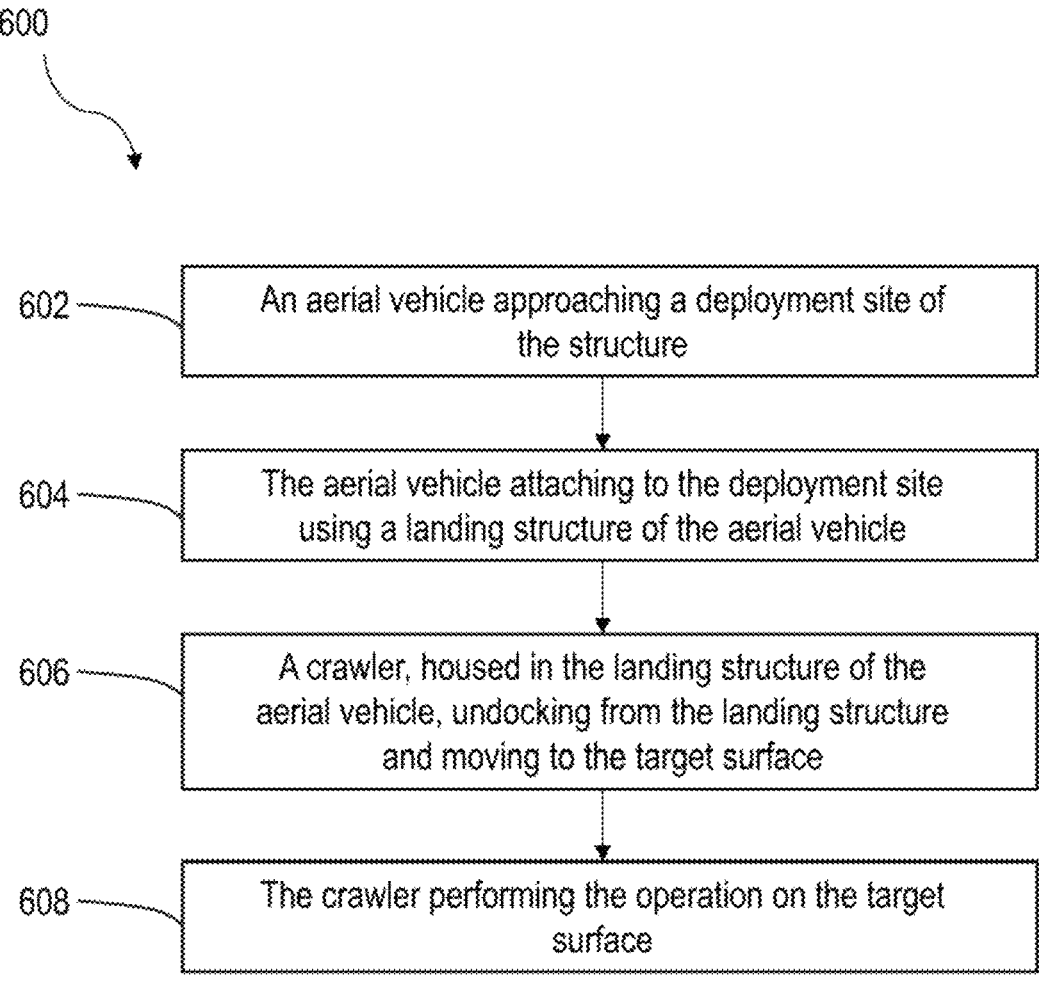

602 — An aerial vehicle approaching a deployment site of the structure

604 — The aerial vehicle attaching to the deployment site using a landing structure of the aerial vehicle 606 — A crawler, housed in the landing structure of the aerial vehicle, undocking from the landing structure and moving to the target surface 608 — The crawler performing the operation on the target surface

FIG. 6

REMOTELY CONTROLLED OR AUTONOMOUS MARSUPIAL SYSTEM AND METHODS FOR REMOTELY OR AUTONOMOUSLY PERFORMING OPERATIONS WITH SAME

TECHNICAL FIELD

The following relates to remotely controlled or autonomous systems and methods for remotely or autonomously performing operations and more particularly to marsupial systems, including an unmanned aerial vehicles carrier capable of carrying a surface robot for performing an operation on a target surface, and methods for remote inspection and/or maintenance.

BACKGROUND OF THE INVENTION

Inspecting and maintaining structural assets, such as pipes and storage tanks, can be challenging or unsafe for humans, particularly in certain environments such as offshore sites. Automated UAVs offer a viable alternative, but direct contact with the asset is often necessary for effective inspection. Landing and maneuvering UAVs on confined spaces and surfaces, such as a collection of neighboring pipes or tanks, is particularly difficult due to the narrow passage and shape of these structures. Accordingly, traditional UAV approaches are less suitable for such tasks.

Accordingly, it is highly desirable to provide a solution that overcomes the above disadvantages.

SUMMARY OF THE INVENTION

According to a first disclosed aspect, a marsupial robotics system is presented herein. The marsupial robotics system includes an aerial vehicle, a crawler detachably carried by the aerial vehicle and configured to perform an operation on a target surface, the aerial vehicle including a landing structure configured to attach to a deployment site. When the aerial vehicle is attached to the deployment site, the crawler is configured to detach from the aerial vehicle and move to the target surface to perform the operation on the target surface.

The crawler may further include actuated wheels and/or legs for moving on the target surface.

The crawler may further include one or more sensors and/or actuators to perform the operation on the surface.

The crawler may be configured for movement underwater.

The operation may be an inspection operation of the target surface, and the one or more sensors disposed on the crawler may be inspection sensors.

The crawler may be detachably received by a housing of the landing structure.

The landing structure may include a landing element from which the landing structure attaches to the deployment site.

The landing structure may be able to rotate in any direction.

The crawler may be the landing element of the landing structure.

The crawler may not be the landing element of the landing structure and instead may be housed within the housing of the landing structure.

The crawler may be retrieved by the aerial vehicle after performing the operation on the target surface.

The crawler may align itself with the landing structure to dock back onto the aerial vehicle.

The crawler may be tethered to the aerial vehicle.

In accordance with another disclosed aspect, a method for performing an operation on a target surface of a structure using a marsupial system is presented herein. The method includes approaching a deployment site of the structure using an aerial vehicle of the marsupial system, causing the aerial vehicle to attach to the deployment site using a landing structure of the aerial vehicle, causing a crawler of the marsupial system, housed in the landing structure of the aerial vehicle, to undock from the landing structure and move to the target surface, and causing the crawler to perform the operation on the target surface.

The method may further include causing the aerial vehicle to move to a retrieval site, causing the crawler to move to the retrieval site, causing the crawler to dock to the aerial vehicle, and causing the aerial vehicle to fly away from the retrieval site.

A marsupial robotics system is provided. The system includes an aerial vehicle and a crawler detachably carried by the aerial vehicle and configured to perform an operation on a target surface, the aerial vehicle including a landing structure configured to attach to a deployment site, and when the aerial vehicle is attached to the deployment site, the crawler is configured to detach from the aerial vehicle and move to the target surface to perform the operation on the target surface.

The crawler may include actuated wheels or legs for moving to or on the target surface.

The crawler may include one or more sensors or actuators disposed thereon to perform the operation on the target surface.

The crawler may be configured to move underwater.

The operation may be an inspection operation of the target surface, and the one or more sensors may be inspection sensors.

The crawler may be detachably received by a housing of the landing structure.

The landing structure may include a landing element by which the landing structure attaches to the deployment site.

The crawler may form the landing element of the landing structure.

The crawler may be separate to the landing element of the landing structure and may be housed within the housing of the landing structure.

The crawler may be retrieved by the aerial vehicle after performing the operation on the target surface.

The crawler may align itself with the landing structure to attach to the aerial vehicle.

The landing structure may be rotatable in any direction.

The crawler may be tethered to the aerial vehicle.

A method for performing an operation on a target surface of a structure is provided. The method includes an aerial vehicle approaching a deployment site of the structure, the aerial vehicle attaching to the deployment site using a landing structure of the aerial vehicle, a crawler, housed in the landing structure of the aerial vehicle, undocking from the landing structure and moving to the target surface, and the crawler performing the operation on the target surface.

The method may further include the aerial vehicle moving to a retrieval site, the crawler moving to the retrieval site, the crawler docking to the aerial vehicle, and the aerial vehicle flying away from the retrieval site.

The crawler may include actuated wheels or legs for moving to or on the target surface, and the crawler may include one or more sensors or actuators disposed thereon to perform the operation on the target surface.

The operation may be an inspection operation of the target surface, and the one or more sensors may be inspection sensors The crawler may be detachably received by a housing of the landing structure.

The landing structure may include a landing element by which the landing structure attaches to the deployment site.

The crawler may form the landing element of the landing structure, or the crawler may be separate to the landing element of the landing structure and may be housed within the housing of the landing structure.

An aerial vehicle is provided. The aerial vehicle is configured to detachably carry a crawler for performing an operation on a target surface. The aerial vehicle includes a landing structure configured to attach to a deployment site. When the aerial vehicle is attached to the deployment site, the aerial vehicle is configured to detach the crawler to enable the crawler to move to the target surface to perform the operation on the target surface.

A crawler is provided. The crawler is detachably carried by an aerial vehicle and configured to perform an operation on a target surface. When the aerial vehicle is attached to the deployment site, the crawler is configured to detach from the aerial vehicle and move to the target surface to perform the operation on the target surface.

Other aspects and features will become apparent, to those ordinarily skilled in the art, upon review of the following description of some exemplary embodiments.

BRIEF DESCRIPTION OF THE DRAWINGS

In the following, embodiments of the present disclosure will be described with reference to the appended drawings. However, various embodiments of the present disclosure are not limited to the arrangements shown in the drawings.

FIG. 6 is a flowchart of a method for performing an operation on a target surface of a structure, according to an embodiment.

DETAILED DESCRIPTION

In describing various embodiments below, reference will be made to numerous structural elements, such as multi-directional landing assemblies, tether cables, electromagnetic and vacuum attachment mechanisms, and sensor arrays. It is to be understood that the numerous features disclosed herein can be interchanged, combined, or omitted depending on implementation details, and that the scope of the present disclosure is not to be narrowly construed by these illustrative examples.

The following relates to remotely controlled or autonomous systems and methods for same and more particularly to marsupial systems including an unmanned aerial vehicles carrier capable of carrying a surface robot for performing an operation on target surfaces. In particular, embodiments disclosed herein relate to the landing of an aerial vehicle and subsequent deployment of a crawler to carry out measurements and other operations on difficult-to-access or confined surfaces.

A marsupial system, where a UAV deploys a crawler robot, addresses challenges faced by conventional inspection and maintenance systems. By releasing the crawler onto the asset, the system enables direct contact for inspection and maintenance, bypassing the need for costly scaffolding and minimizing safety risks. A method of inspection or maintenance using the marsupial system may be particularly useful for hard-to-reach, elevated assets in oil and gas facilities, ensuring efficient and safer inspection without the hazards of traditional manual methods.

Figure 1:
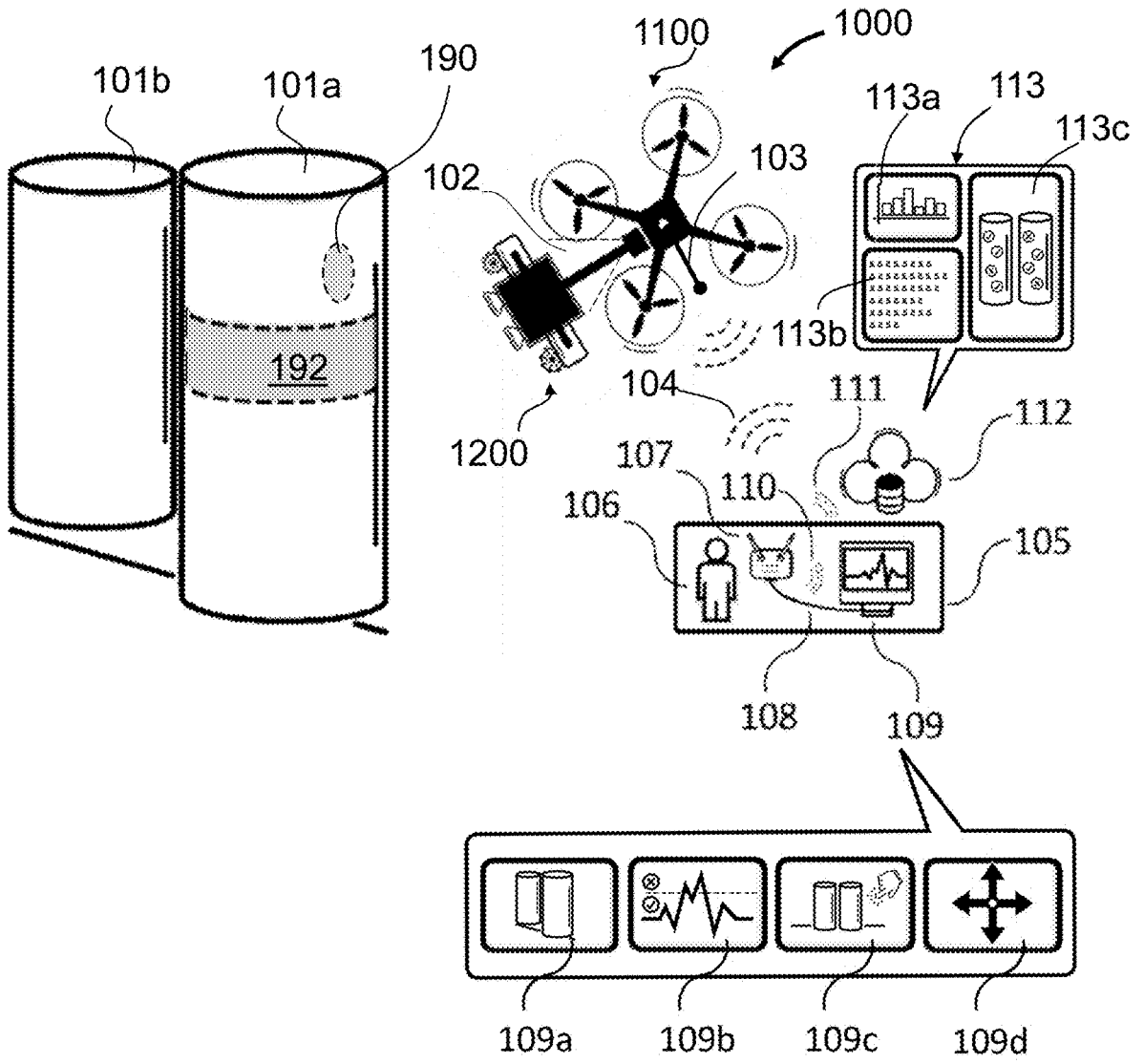
FIG. 1 is a schematic view of a remotely controlled or autonomous marsupial system for performing an operation on a structure, according to an embodiment.

Referring now to FIG. 1, shown therein is a schematic view of a remotely controlled, autonomous, or semi-autonomous marsupial system 1000 for performing an operation on a structure, according to an embodiment.

In a preferred embodiment, the operation is or includes performing inspection and/or maintenance on the structure.

In another embodiment, the operation is or includes operations other than performing inspection and/or maintenance on the structure.

The marsupial system 1000 comprises an aerial inspection vehicle 1100 and crawler 1200 detachably carried on the aerial inspection vehicle 1100. In FIG. 1, the marsupial system 1000 is shown operating in an open-space environment for inspection of metallic or non-metallic structure and surfaces, such as a tank 101a.

In an embodiment, the marsupial system 1000 is configured to operate in enclosed or confined spaces, such as the inner space of the tank 101a. The aerial vehicle 1100 is configured to collaboratively work with the crawler 1200 to successfully conduct an inspection mission related to one or more target surfaces of the exterior and/or interior of the tank 101a. In the embodiment shown in FIG. 1, inspection of a target surface 192 is desired. The aerial vehicle 1100 is configured to house and carry the crawler 1200 to a deployment site 190 near the target surface 192 to deploy the crawler for inspection of the target surface 192. In an embodiment, the deployment site 190 is a portion of the target surface 192. In an embodiment, the deployment site 190 is located near the target surface 192. The advantages of the marsupial system 1000 are particularly apparent where the target surface 192 is near confined spaces that are inaccessible to or hard to access by the aerial vehicle 1100, such as the tight space between the tank 101a and an adjacent tank 101b.

Figure 2A:
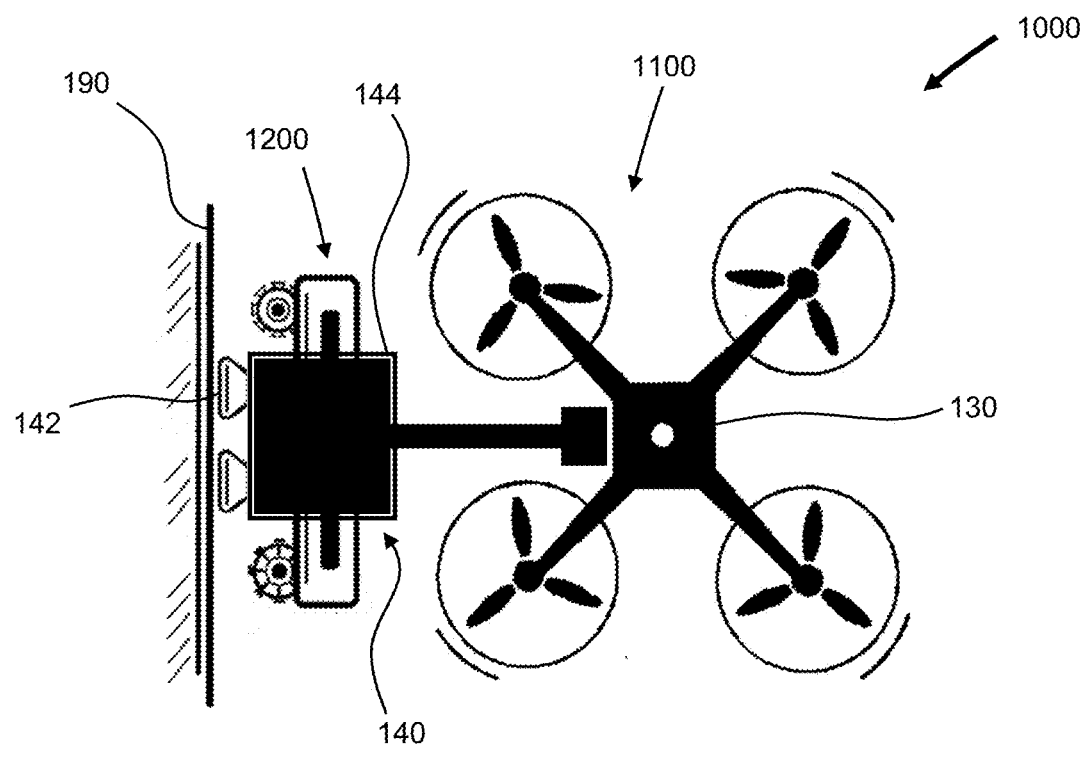
FIGS. 2A and 2B are side views of an aerial vehicle and a crawler of the marsupial system of FIG. 1.
Figure 2B:
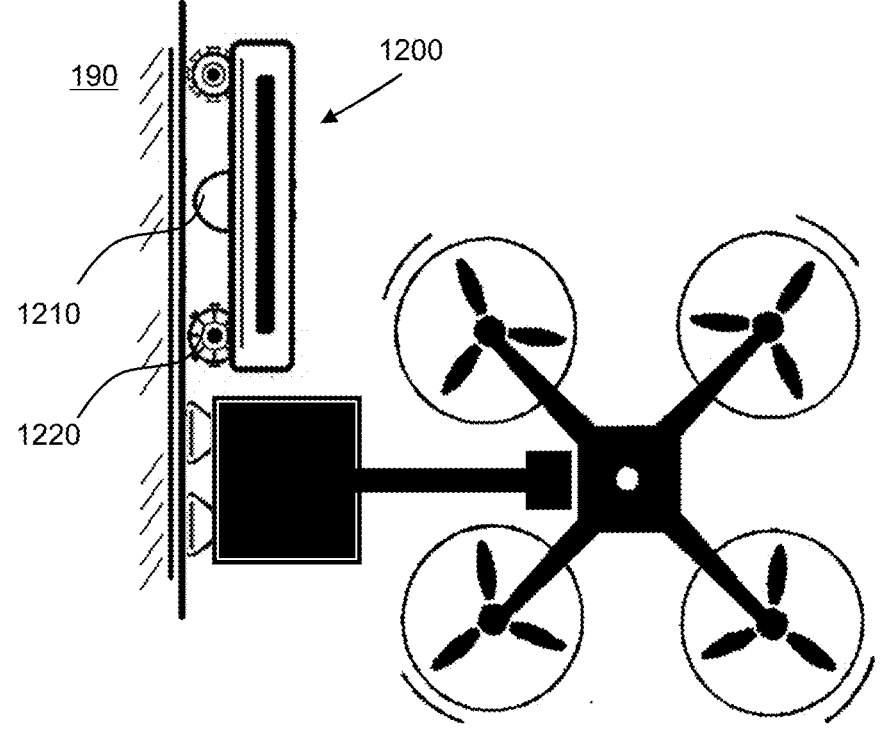

Referring now to FIGS. 2A and 2B, shown therein are side views of the aerial vehicle 1100 and the crawler 1200 of the marsupial system 1000. The aerial vehicle 1100 includes a body 130 and a landing structure 140 fixedly or movably attached to the body 130. The landing structure 140 houses one or more attaching support structures 142, such as one or more electromagnetic cores, one or more vacuum cups, and/or one or more mechanical grippers, or a combination thereof to facilitate landing on and attachment of the aerial vehicle 1100 to the deployment site 190 on the tank 101a. The landing structure 140 further comprises a housing 144 to house the crawler 1200. As shown in FIG. 2B, once the aerial vehicle 1100 is landed on the deployment site 190, the crawler 1200 undocks from the aerial vehicle 1100 and moves out of the housing 144 to crawl on the tank 101a.

The landing structure 140 may not house any support structures 142 at a point in time (e.g., where a support structure 142 is not desired to facilitate landing the aerial vehicle 1100 at a deployment site).

The crawler 1200 is configured to carry at least one surface measurement sensor 1210 and move on the tank 101*a* using one or more magnetic wheels 1220. Other mechanisms such as vacuumed wheels, articulated legs, chain tracks, or a combination thereof may be used to move the crawler on the tank 101*a*. The wheels 1220 may be driven using one or more motors or mechanical grippers. The sensor 1210 is used to collect measurement data from the surface 101*a* when the crawler is attached to the surface. The sensor 1210 may be or may include one or more of ultrasound thickness sensors, Eddy current sensors, coating surface profilometry sensors, electromagnetic acoustic transducer (EMAT) sensors, phased array ultrasonic testing (PAUT) sensors, vision cameras, and/or any combination thereof. Measurement data may be collected by a controller (not shown) onboard the crawler 1200, or may be transmitted to the aerial vehicle 1100 or a remote station (such as a cloud 112 or a base station 105). The measured data may be transmitted in a real-time fashion or may be stored in a memory unit of the crawler 1200 for further processing after completion of an inspection mission. A data transfer link and a remote-control link may operate at different frequency bands to avoid interference.

The sensor 1210 may be attached to a holder (not shown) that may move in 3 dimensions by way of electrical actuators. The sensor 1210 may employ a motorized gimbal that may house a high-definition visual camera. The sensor 1210 may employ inspection sensors (e.g., spectral, gas) and navigation sensors (e.g. light detection and ranging (LiDAR), infrared, radar). The crawler 1200 may house a tether module (not shown) and a mounting for a tether (not shown) connecting the crawler 1200 to the aerial vehicle 1100 for retrieval and power and data communication, for example.

After measurements by the sensor 1210 are completed, the aerial vehicle 1100 may approach a retrieval site (not shown), which may be similar to the deployment site 190, and land on the retrieval site so that the crawler 1200 is able to return and dock back to the housing 144. The crawler 1200 may be equipped with alignment sensors (not shown) to align itself with the housing 144 to drive into the housing 144 and dock back to the landing structure 140 during retrieval. Additionally, the housing 144 or the crawler 1200 may include latching or docking mechanisms (not shown) to securely couple together.

In an embodiment, the attaching support structures 142 are disposed on the crawler 1200 rather than the landing structure 140 of the aerial vehicle 1100. In such embodiments, the crawler 1200 may function as the landing element of the landing structure 140 and cause the aerial vehicle to land on the deployment site 190. Moreover, for retrieval of the crawler 1100, the landing structure 140 of the aerial vehicle 1100 may attach directly to the crawler 1200.

Referring back to FIG. 1, the aerial vehicle 1100 is further equipped with similar or additional inspection sensors to the sensor 1210 to collect further measurement data from the tank 101*a*. The aerial vehicle 1100 is equipped with a primary sensory module 102 (e.g., visual sensor, thermal sensor) for inspection of the surface of the tank 101*a*. The aerial vehicle 1100 may incorporate further sensory units (not shown) for navigation (e.g., GPS, camera, radar, LiDAR.) and light sources (not shown) for inspection of dark enclosed spaces. The aerial vehicle 1100 may further include onboard control electronics attached to the main body 130 to coordinate the propulsion, sensing, data acquisition, and communications operations of the aerial vehicle 1100. The onboard control electronics may include a flight controller (as shown by 503 in FIG. 5), which fuses sensor inputs (e.g., gyroscope, accelerometer, magnetometer) and external data (e.g., GPS, LiDAR, radar) to maintain stable flight. The onboard control electronics may further include a navigation subsystem (not shown) for autonomous or semi-autonomous operations, capable of path planning to certain waypoints in open or enclosed environments. When operating within an enclosed or GPS-denied space (such as the interior of a storage tank), the aerial vehicle 1100 may rely on LiDAR-based Simultaneous Localization and Mapping (SLAM) or other local navigation techniques. The onboard control electronics may further include wireless communication modules (e.g., 2.4 GHz, 5 GHz radio links, alternative frequency bands) to transmit real-time video feeds, sensor data, and telemetry to the base station 105 or to receive commands from the remote operator 106. The aerial vehicle 1100 may also incorporate a secondary data link specifically for a tether cable (as shown by 304 in FIG. 3), thereby providing a secure and robust communication channel if radio signals degrade.

The aerial vehicle 1100 may optionally integrate an onboard computer (e.g., a single-board computer with GPU acceleration) for local data processing, which may be particularly advantageous where it is desirable for high-resolution sensor data from the crawler or from the vehicle's 1100 own sensors to be quickly analyzed (e.g., ultrasonic signals, high-resolution thermal imaging). While such advanced processing may also be offloaded to a ground station or a cloud service, onboard computation reduces latency and reliance on robust radio bandwidth.

Each of the aerial vehicle 1100 and the crawler 1200 of the marsupial system 1000 may be remotely controlled from a base station 105 where a human user or operator 106 controls them through a remote controller 107 (or a transceiver) and a wireless link 104. In an embodiment, the wireless link 104 is instead achieved through a wired link such as the tether cable 304 (shown in FIG. 3). The wireless link 104 may establish a line-of-sight or non-line-of-sight communication between the remote controller 107 and a wireless transceiver module 103 of the aerial vehicle 1100 and the crawler 1200. The crawler 1200 may communicate with the aerial vehicle 1100 or the base station 105 by a wireless channel or through a tether cable (not shown). The crawler 1200 may be supplied by an internal power storage (not shown) or may receive energy through the tether cable 304 from a power supply unit (not shown) of the aerial vehicle 1100.

The measurement data received from the crawler 1200 and/or the aerial vehicle 1100 at the base station 105 may be transferred to a local computer 109 through a wired line 108 or by a wireless communication link 110. The local computer 109 may include an interactive user interface or interactive display to communicate data between the computer 109 and the user 106. The user interface may display the data received from the aerial vehicle 1100 and crawler 1200 to the user 106 in real-time. Additionally, the user interface is configured to display real-time video 109*a* of the target structure 101*a*, display primary real-time processed measurement results 109*b*, enable the user 106 to tag individual measurement results on associated spots on a 3-dimensional map 109*c* of the target structure, and provide an interface 109*d* to enable the user 106 to control aspects (such as movement directions, speed, acceleration, break, altitude, etc.) of the aerial vehicle 1100 and the crawler 1200. The user interface may further send the communicated data to a cloud server 112 through a second wireless link 111 for storage and post processing. The cloud server 112 may further process measurement data and generate analytics, insights and reports 113 related to the marsupial system's 1000 operations (e.g., aerial vehicle and crawler maintenance, fault detection, diagnosis), inspection results, and performance (battery performance and status, operational performance and effectiveness related to both the aerial vehicle 1100 and the crawler 1200). The reports 113 may incorporate post-processed measurement results 113*a*, a textual summary 113*b* of the inspection, and a visual representation 113*c* of the processed measurement results.

Alternatively, or additionally, the measurement data or processed data at the base station 105 may be transferred to the cloud database 112 via the wireless communication link 111.

The aerial vehicle 1100 may be preprogrammed at the base station 105 pre-flight where a mission path may be broken down into way points and measurement stops. The waypoints and measurement stops may be stored in the internal memory of the aerial vehicle 1100. The aerial vehicle 1100 may be equipped with collision avoidance sensors (e.g., LIDAR) which continuously scan surroundings of the aerial vehicle 1100 to enable the aerial vehicle 1100 to avoid unforeseen obstacles along the pre-programmed mission path. The wireless communication link 104 may be continuously maintained between the base stations 105 and the aerial vehicle 1100 to enable the base station operator 106 to take over the control of the aerial vehicle 1100 in a case of emergency.

The aerial vehicle's 1100 propulsion arrangement may include anywhere from four to eight rotors for stable and redundant flight, though other propulsion configurations may be employed to match the desired payload capacity, such as weight of the crawler 1200 and attached sensory systems, and flight environment (e.g., multi-copter, hybrid fixed-wing, tilt-rotor). The frame material of the aerial vehicle's 1100 may be a lightweight composite, aluminum alloy, or carbon fiber to minimize total mass while preserving structural integrity and reduce power consumption, for example. Within or upon the body 130, there is housed a power supply (not shown in figures), typically one or more batteries.

Figure 3:
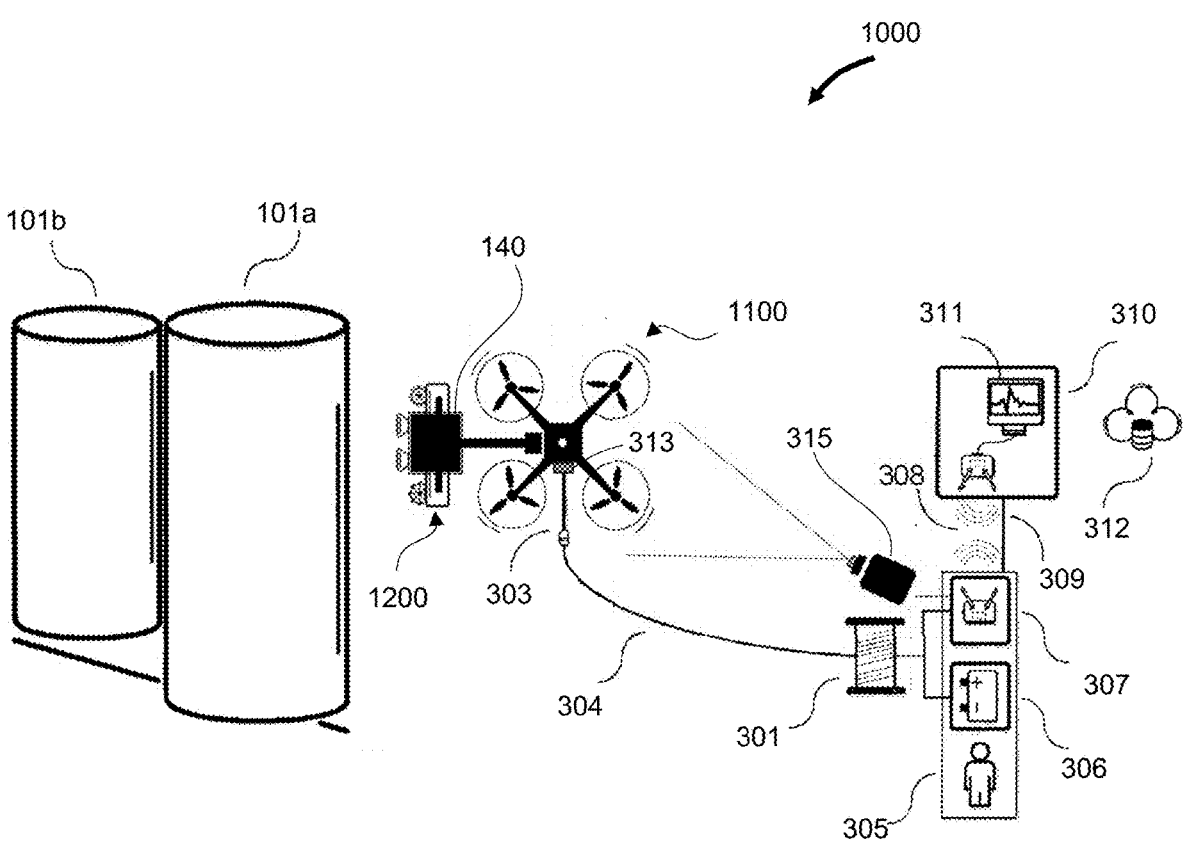
FIG. 3 is a schematic view showing the marsupial system of FIG. 1 using a tether cable and an associated tether module.

Referring now to FIG. 3, shown therein is a schematic view of the marsupial system 1100 using a tether cable 304 and an associated tether module (not shown). The tether cable 304 is configured to deliver continuous power from a base station 305, thereby avoiding flight-time constraints associated with batteries alone. The tether cable 304 may be connected to a spool 301 positioned near the base station 305. The spool 301 may be tension-controlled. The spool 301 slightly pulls the tether cable 304 to maintain the cable 304 taut in order to prevent entangling of the cable 304. The tether cable 304 may be connected to a power source 306 positioned at the base station 305. The power source 306 may be a high-capacity DC supply or an AC supply, which is rectified at the base station 305 before being transmitted to the aerial vehicle 1100. A controller 307 is connected to the tether cable 304 to transfer flight control commands to the aerial vehicle 1100 and receive measurement data and captured images and videos from the marsupial system 1000. The tether cable 304 may carry electrical power to enable an indefinitely long flight time. The tether cable 304 may carry flight commands to enable control of the aerial vehicle 1100 and more generally the marsupial system 1000. The tether cable 304 may be connected to the aerial vehicle 1100 through a flexible tether mount structure 303.

The system 1000 further includes a tether module 313 operably mounted on the aerial vehicle 1100 and configured to interface with the tether cable 303. The tether module may be configured to facilitate bidirectional transmission of electrical power and communication signals between the aerial vehicle 1100 and the base station 305 through the tether cable 303. The tether module 313 may include electrical power and signal conditioning circuitry to, for example, perform voltage level conversion and/or maintain signal integrity over long tether cable 303 length and distances, mitigating issues such as attenuation, electromagnetic interference, and impedance mismatch. The tether module 313 may further comprise integrated transceivers and protocol converters to support digital and analog command channels and may further incorporate optical-electrical transduction components to enable hybrid communication via fiber optics. The tether module 313 may be electrically isolated and shielded to ensure robust operation in high-noise industrial environments. The tether module 313 may be configured to support real-time data throughput for high-bandwidth inspection payloads while simultaneously handling power distribution, flight control commands, and sensor telemetry without latency or degradation.

In some cases where remote operation of the marsupial system 1100 is desired, for example when inspecting an unsafe surface or environment, a transceiver 307 may be incorporated into the base station 305 to transfer control commands between the base station 305 and a remotely located control station 310 through a wireless link 308 or a wired link 309. The measurement data, received from the marsupial system 1000, may be further processed and stored at a remote processor 311 or a cloud database 312. A video camera (not shown) and an associated light source 315 may be placed at the operating site to simulate a line-of-sight view for the remotely located user.

Figure 4:
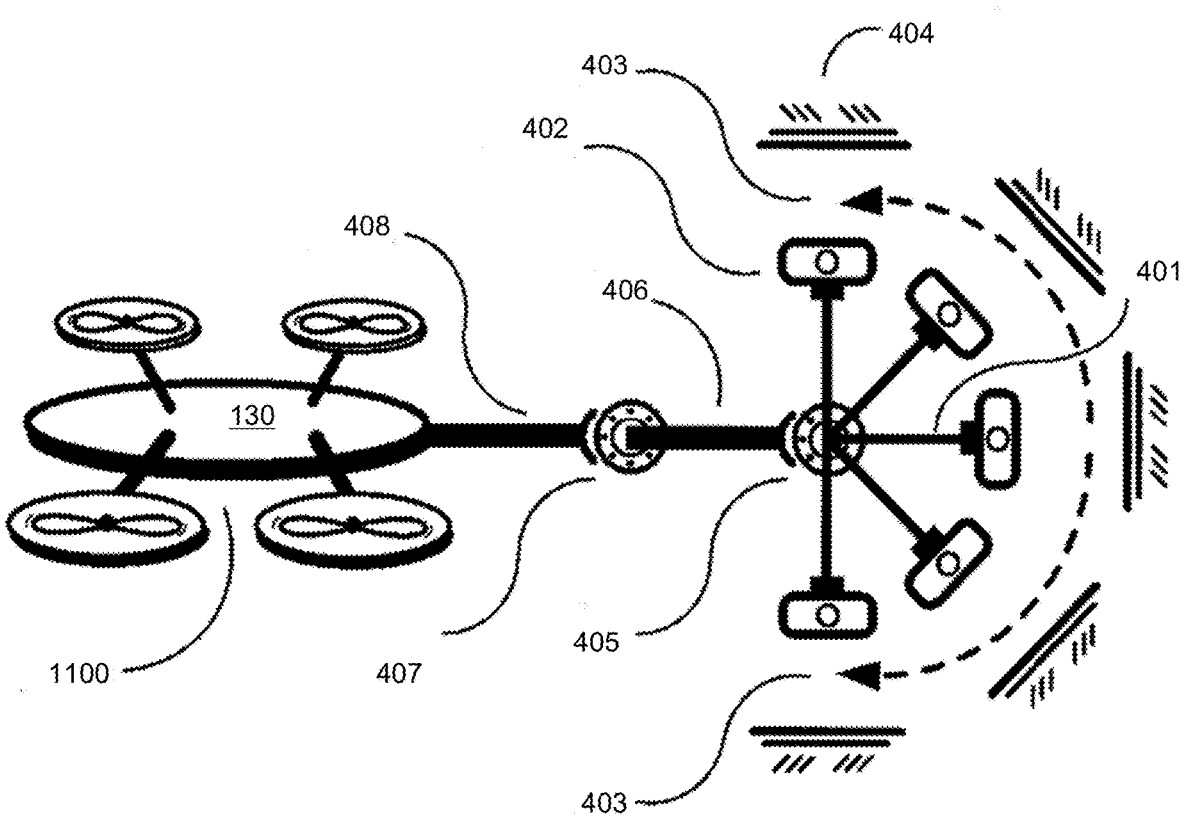
FIG. 4 is a bottom view of a landing structure of the aerial vehicle of FIG. 1.

Referring to FIG. 4, shown therein a bottom view of a multi-directional landing structure 402 attached to the aerial vehicle 1100. The landing structures 402 may rotate in different directions (e.g., upwards, downwards, lateral, and/ or any angle in between) to enable landing of the aerial vehicle 1100 on different surfaces. A vertical position of the landing structure 402 may correspond to upward and downward motion of the landing structure 402 to enable landing of vehicle the 1100 on horizontal surfaces (e.g., ceiling and floor). A horizontal position of the landing structure 402 may correspond to lateral motion of the landing structure 402 to enable landing on any angled surface(s) (e.g., surface of a pipe or tank 101*a*).

According to the embodiment shown in FIG. 4, the landing structure 402 (which may be the landing structure 140 of FIG. 2A) comprises one or more rotary arms 401 (collectively referred to as the rotary arms 401 and generically as the rotary arm 401) configured to extend and rotate by any arbitrary angle about a pivot joint 405 along a rotational direction 403. The rotational motion of the rotary arm 401 may enable landing of the aerial vehicle 1100 on any angular surface 404 relative to the aerial vehicle 1100. In some aspects, depending on mission constraints, the rotary arm 401 may further be configured to extend or retract. For example, in cases where the aerial vehicle 1100 is to remain anchored for an extended interval (e.g., while the crawler 1200 is performing contact-based inspection and scanning on the tank 101*a* exterior surface), the rotary arm 401 enables a robust hold, preventing drift or wind-induced dislodgement. The rotary arm 401 may carry the housing 144 and the support structure 142 of FIG. 2A. The aerial vehicle 1100 may incorporate one or multiple additional rotary arms 406 rotating around additional actuated or passive pivot joints 407 to increase one or more spatial degrees of freedom of the landing structure 402. The rotary joint 407 may attach to the aerial vehicle 1100 through an additional connecting arm 408 or the rotary joint 407 may be integrated inside the body 130 of the aerial vehicle 1100. The additional connecting arm 408 may be extendable or fixed.

The rotary joints 405 and 407 may be passive or actuated, for example using an electrical motor.

In an embodiment, the landing structure 402 incorporates force or torque sensors (not shown) on the rotary arms 401 to gauge the contact pressure with the deployment site 190. The incorporated force or torque sensors advantageously provide the aerial vehicle 1100 with feedback on attachment to the deployment site 190. For example, the feedback may advantageously help prevent exerting excessive force that might damage fragile surfaces or the landing structure 402 and may further help detect partial slippage that may indicate impending detachment. In an embodiment, a control loop (e.g., implemented by the flight controller 503 of FIG. 5) automatically adjusts angles of the arms 401, 408 or electromagnetic currents of the joint actuators 405, 407 to maintain a constant attachment force.

Figure 5:
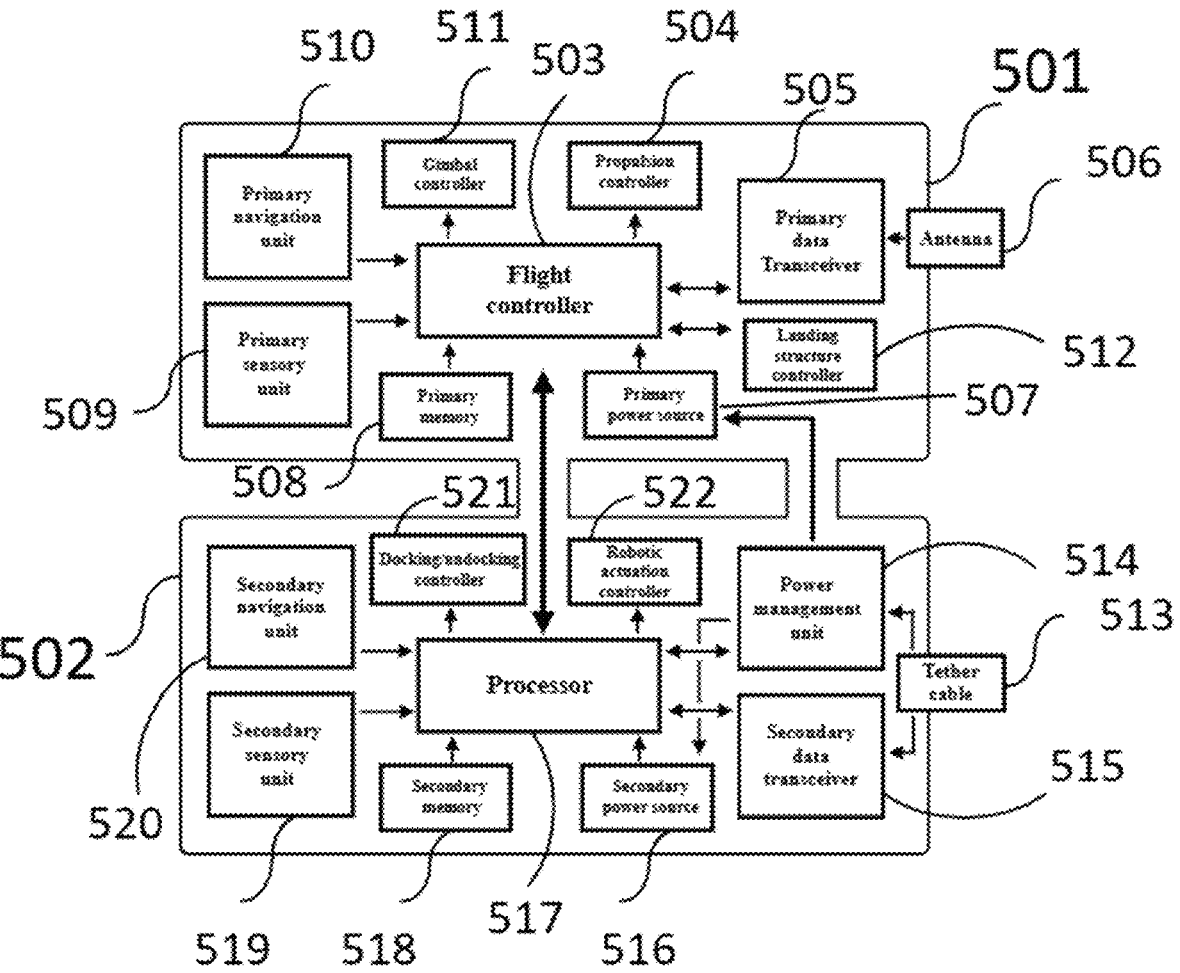
FIG. 5 is an electrical block diagram of the marsupial system of FIG. 1.

Referring now to FIG. 5, shown therein is an electrical block diagram of system components of the marsupial system 1000 embodied in the aerial vehicle 1100 and the crawler 1200.

An aerial vehicle control board 501 comprises a flight controller 503 as a main controller unit. The flight controller 503 receives flight commands from an operator and/or flight sensors and/or stored flight path and translates the data into appropriate signals to fly and navigate the aerial vehicle 1100. The flight controller 503 controls a propulsion controller 504, a gimbal controller 511, and a landing structure controller 512. The propulsion controller 504 receives commands from the flight controller 503 and dynamically drives and controls the speed of the propulsion unit (e.g., electrical motors and propellers). The gimbal controller 511 receives commands from the flight controller 503 and dynamically stabilizes and moves a gimbal that may house a sensor (e.g., camera). The landing structure controller 512 receives commands from the flight controller 503 and dynamically drives and controls the angle of the rotary arms 401 and/or 406 (e.g., the joint actuators 405 and/or 407).

The landing structure controller 512 further receives commands from the flight controller 503 pertaining to docking or undocking of the crawler 1200 and scheduling of its pickup and drop off. The flight controller 503 communicates with and controls a primary sensory unit 509. The flight controller 503 continuously (or periodically) monitors a primary navigation unit 510 to control and correct the flight path of the vehicle 1100. The flight controller 503 reads data and/or instructions from a primary memory unit 508 for flight path data (e.g., in autonomous mode) and/or writes the measurement data to the memory unit 508 to be restored for further processing. The flight controller 503 is powered by a primary power source 507 (e.g., battery). The flight controller 503 is in electrical communication with a primary data transceiver 505 to receive flight commands and to transmit real-time telemetry data and measurement data. The primary data transceiver 505 may be connected to an antenna 506 that enables wireless communication with the base station.

A control board 502 of the crawler 1200 includes a crawler processor 517 as a main controller unit. The crawler processor 517 communicates with the flight controller 503 and includes a docking/undocking controller 521 and a robotic actuation controller 522 configured to navigate and operate the crawler 1200 for the purposes of movement on a surface and inspection. The docking/undocking controller

521 is configured to facilitate docking and undocking of the crawler 1200 to the landing structure 140 (e.g. by releasing or activating a latching or docking mechanism to securely couple to the housing 144) and may further be configured to use sensory data, such as alignment sensory data, to align and dock to the housing 144 of the landing structure 140. The crawler processor 517 communicates with and/or controls a secondary sensory unit 519 (e.g., ultrasound, Eddy current, surface profilometry, EMAT). The crawler processor 517 monitors a secondary navigation unit 520 and reports to the flight controller 503. According to an embodiment, the processor 517 is supplied by a power management unit 514 through a tether cable 513 connecting the power management unit 514 and a secondary data transceiver 515. The power management unit 514 charges a secondary power source 516 (e.g., a rechargeable battery) onboard the crawler 1200. The crawler processor 517 receives control information from and/or writes measurement data on a secondary memory unit 518.

The advantages of the present marsupial system 1000 include: providing access to complex, confined, and tight structures; being capable of scanning a target area from a single attachment point of the aerial vehicle; reducing aerial vehicle maneuvering complexity by using the crawler 1200 as the main device for inspection; scanning capabilities for pipes at higher and remote access points; marsupial collaboration for executing on complex and difficult missions; and replacing manual rope access or scaffold erection with an autonomous or semi-autonomous system to enable safer operations, which typically reduces the total downtime for facility assets.

Throughout this disclosure, inspection of a surface is disclosed as a principal use of the marsupial system 1000. However, a similar marsupial system, with the main features, functionalities, and components as described herein, may be configured for other purposes and applications such as maintenance of structures (e.g., pipes and tanks), surveillance and military application (e.g., sweeping mines, particularly using the crawler 1200), and generally conducting a process or pre-process (e.g., painting, depositing a material, vibrating, washing and cleaning) on a hard-to-access surface. In such other uses, purposes, and applications, the crawler 1200 and the aerial vehicle 1100 may be equipped with suitable sensors, actuators, modules, and processing heads (in addition to or instead of the inspection sensor 1210) to enable the marsupial system 1000 in achieving such other uses, purposes, and applications. Additionally, the aerial vehicle may carry different crawler types, each with specific or unique locomotion or sensor capabilities, suitable for various surfaces (magnetic or not) or tasks (inspection, cleaning, painting).

Furthermore, in an embodiment, a similar marsupial system to the marsupial system 1000 is suitable to be used to inspect a marine or submarine target surface. The aerial vehicle 1100 may be configured to land or float on the surface of water or alternatively on a solid surface near the water surface, and the crawler 1200 may be configured to move or dive underwater for inspection of marine or submarine target surfaces. In such an embodiment, the aerial vehicle 1100 and the crawler 1200 and their onboard and attached hardware system may advantageously be configured to be water-resistant with proper ingress protection (IP) rating.

Referring now to FIG. 6, shown therein is a flowchart of a method 600 for performing an operation on a target surface of a structure, according to an embodiment.

At 602, the method 600 includes an aerial vehicle approaching a deployment site of the structure.

At 604, the method 600 includes the aerial vehicle attaching to the deployment site using a landing structure of the aerial vehicle.

At 606, the method 600 includes a crawler, housed in the landing structure of the aerial vehicle, undocking from the landing structure and moving to the target surface.

At 608, the method 600 includes the crawler performing the operation on the target surface.

While specific embodiments have been described and illustrated, such embodiments should be considered illustrative only and not as limiting the disclosed embodiments as construed in accordance with the accompanying claims. Although the aspects described herein may have been described individually, any and all aspects may be combined consistent with the understanding of those skilled in the art. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A marsupial robotics system comprising:
an aerial vehicle; and
a crawler detachably carried by the aerial vehicle and configured to perform an operation on a target surface;
wherein the aerial vehicle comprises a landing structure configured to attach to a deployment site, and wherein when the aerial vehicle is attached to the deployment site, the crawler is configured to detach from the aerial vehicle and move to the target surface to perform the operation on the target surface;
wherein the landing structure includes a housing forming a landing element by which the landing structure attaches to the deployment site, the housing configured to fully enclose the crawler when the crawler is carried by the aerial vehicle.

2. The marsupial system of claim 1, wherein the crawler comprises actuated wheels or legs for moving to or on the target surface.

3. The marsupial system according to claim 1, wherein the crawler comprises one or more sensors or actuators disposed thereon to perform the operation on the target surface.

4. The marsupial system according to claim 1, wherein the crawler is configured to move underwater.

5. The marsupial system according to claim 1, wherein the operation is an inspection operation of the target surface, and wherein the one or more sensors are inspection sensors.

6. The marsupial system according to claim 1, wherein the crawler is detachably received by the housing of the landing structure.

7. The marsupial system according to claim 1, wherein the crawler is retrieved by the aerial vehicle after performing the operation on the target surface.

8. The marsupial system of claim 7, wherein the crawler aligns itself with the landing structure to attach to the aerial vehicle.

9. The marsupial system according to claim 1, wherein the landing structure is rotatable in any direction.

10. The marsupial system according to claim 1, wherein the crawler is tethered to the aerial vehicle.

11. The marsupial system of claim 1, wherein the landing structure comprises an articulated arm attached to a main body of the aerial vehicle by a rotary joint, the articulated arm configured to position the housing, and wherein the articulated arm forms a second landing element that is configured to attach to the deployment site when carrying the housing.

12. A method for performing an operation on a target surface of a structure, the method comprising:
an aerial vehicle approaching a deployment site of the structure;
the aerial vehicle attaching to the deployment site using a landing structure of the aerial vehicle, the landing structure including a housing forming a landing element by which the landing structure attaches to the deployment site;
a crawler, housed in the housing of the landing structure of the aerial vehicle, undocking from the landing structure and moving to the target surface; and
the crawler performing the operation on the target surface;
wherein the crawler, when housed in the housing of the landing structure, is fully enclosed by the housing.

13. The method of claim 12 further comprising:
the aerial vehicle moving to a retrieval site;
the crawler moving to the retrieval site;
the crawler docking to the aerial vehicle; and
the aerial vehicle flying away from the retrieval site.

14. The method of claim 12, wherein the crawler comprises actuated wheels or legs for moving to or on the target surface, and wherein the crawler comprises one or more sensors or actuators disposed thereon to perform the operation on the target surface.

15. The method of claim 14, wherein the operation is an inspection operation of the target surface, and wherein the one or more sensors are inspection sensors.

16. The method of claim 12, wherein the crawler is detachably received by a housing of the landing structure.

17. The method of claim 12, wherein the landing structure comprises an articulated arm attached to a main body of the aerial vehicle by a rotary joint, the articulated arm configured to position the housing, and wherein the articulated arm forms a second landing element that is configured to attach to the deployment site when carrying the housing.

18. An aerial vehicle, the aerial vehicle configured to detachably carry a crawler for performing an operation on a target surface, the aerial vehicle comprising:
a landing structure configured to attach to a deployment site, wherein the landing structure includes a housing forming a landing element by which the landing structure attaches to the deployment site, the housing configured to fully enclose the crawler when the crawler is carried by the aerial vehicle;
wherein when the aerial vehicle is attached to the deployment site, the aerial vehicle is configured to detach the crawler to enable the crawler to move to the target surface to perform the operation on the target surface.

19. The aerial vehicle of claim 18, wherein the landing structure comprises an articulated arm attached to a main body of the aerial vehicle by a rotary joint, the articulated arm configured to position the housing, and wherein the articulated arm forms a second landing element that is configured to attach to the deployment site when carrying the housing.

20. A crawler, the crawler detachably carried by an aerial vehicle and configured to perform an operation on a target surface, wherein when the aerial vehicle is attached to the deployment site by a landing structure of the aerial vehicle, the landing structure comprising a housing, the crawler is configured to detach from the aerial vehicle and move to the target surface to perform the operation on the target surface, wherein the crawler, when carried by the aerial vehicle, is fully enclosed by the housing, the housing forming a landing element by which the landing structure attaches to the deployment site.

21. The crawler of claim 20, wherein the landing structure comprises an articulated arm attached to a main body of the aerial vehicle by a rotary joint, the articulated arm configured to position the housing, and wherein the articulated arm forms a second landing element that is configured to attach to the deployment site when carrying the housing.

\* \* \* \* \*